United States Patent
Latreille et al.

(10) Patent No.: US 7,430,266 B2
(45) Date of Patent: Sep. 30, 2008

(54) PROCEDURE AND MEANS FOR REPLACING AND PROCEDURE FOR REPAIRING A SECTION OF A PIPE IN THE PRIMARY CIRCUIT OF A NUCLEAR REACTOR

(75) Inventors: Pascal Latreille, Saint Germain du Plain (FR); Jean-Michel Channussot, Givry (FR)

(73) Assignee: Framatome ANP, Courbevoie (FR)

(*) Notice: Subject to any disclaimer, the term of this patent is extended or adjusted under 35 U.S.C. 154(b) by 0 days.

(21) Appl. No.: 11/416,105

(22) Filed: May 3, 2006

(65) Prior Publication Data
US 2006/0198488 A1 Sep. 7, 2006

Related U.S. Application Data

(62) Division of application No. 10/394,219, filed on Mar. 24, 2003, now Pat. No. 7,139,356.

(30) Foreign Application Priority Data
Mar. 22, 2006 (FR) .................................. 02 03635

(51) Int. Cl.
*G21C 19/00* (2006.01)
(52) U.S. Cl. ................... 376/260; 376/361; 376/294; 376/292; 29/428; 29/390.043
(58) Field of Classification Search ................ 376/260, 376/361, 294, 292; 29/428, 390.043, 890.043
See application file for complete search history.

(56) References Cited

U.S. PATENT DOCUMENTS

| | | | | |
|---|---|---|---|---|
| 4,672,741 A | * | 6/1987 | Zafred et al. | 29/726 |
| 4,679,297 A | * | 7/1987 | Hansen et al. | 483/1 |
| 4,709,265 A | * | 11/1987 | Silverman et al. | 348/158 |
| 4,782,727 A | | 11/1988 | Martin et al. | |

(Continued)

FOREIGN PATENT DOCUMENTS

| | | |
|---|---|---|
| EP | 0158544 | 10/1985 |
| EP | 0817205 A1 | 1/1998 |
| FR | 2780907 | 1/2000 |
| JP | 2780907 | 7/1998 |
| NL | EP 0 434 868 A1 * | 3/1991 |

OTHER PUBLICATIONS

JP 2002220049, "Piping repairing robot, for nuclear power station, has expandable and contractible link mechanism between crawler and cylindrical section, to move crawler radially when air cylinder expnads," Aug. 6, 2002.*
France Search Report, FA 619392 FR 0203635, Jan. 29, 2003, pp. 1-2.

*Primary Examiner*—Rick Palabrica
(74) *Attorney, Agent, or Firm*—Connolly Bove Lodge & Hutz LLP

(57) ABSTRACT

Marking of the cuts which have to be made, cutting of the section at two ends, removal of the section which has to be replaced, bevelling of the joint ends of the parts remaining after the section has been cut out from the pipe, adjustment of a new or replacement section for length and bevelling of its joining ends and positioning and narrow bevel welding of the ends joining the replacement section to the ends of the remaining parts of the pipe are performed outside the pipe. Within the pipe operations of machining and inspecting an internal part of the joining ends welded together are performed by remote control in a programmed way by introducing and positioning means for working within the pipe from a component of the primary circuit. The procedure is in particular used to effect the replacement of a section of a cold leg of the primary circuit using means for carrying out work comprising a robot arm secured to a supporting chassis borne by a carriage which moves the means for carrying out work within the cold leg inserted into the cold leg through the volute of the primary pump of the nuclear reactor.

1 Claim, 13 Drawing Sheets

U.S. PATENT DOCUMENTS

| | | |
|---|---|---|
| 4,847,038 A | 7/1989 | Martin |
| 4,919,194 A * | 4/1990 | Gery et al. .................. 165/11.2 |
| 4,954,312 A * | 9/1990 | McDonald et al. .......... 376/260 |
| 5,017,329 A * | 5/1991 | Vermaat ...................... 376/249 |
| H1115 H * | 12/1992 | Nachbar .................... 165/11.1 |
| 5,254,835 A * | 10/1993 | Dalke et al. ............. 219/125.11 |
| 5,519,742 A | 5/1996 | Chauvin et al. |
| 5,683,287 A * | 11/1997 | Martineau et al. ............... 451/1 |
| 5,918,911 A * | 7/1999 | Sims ........................... 285/13 |
| 6,247,231 B1 * | 6/2001 | Findlan et al. ......... 29/890.031 |
| 2004/0099175 A1* | 5/2004 | Perrot et al. ............. 104/138.1 |

* cited by examiner

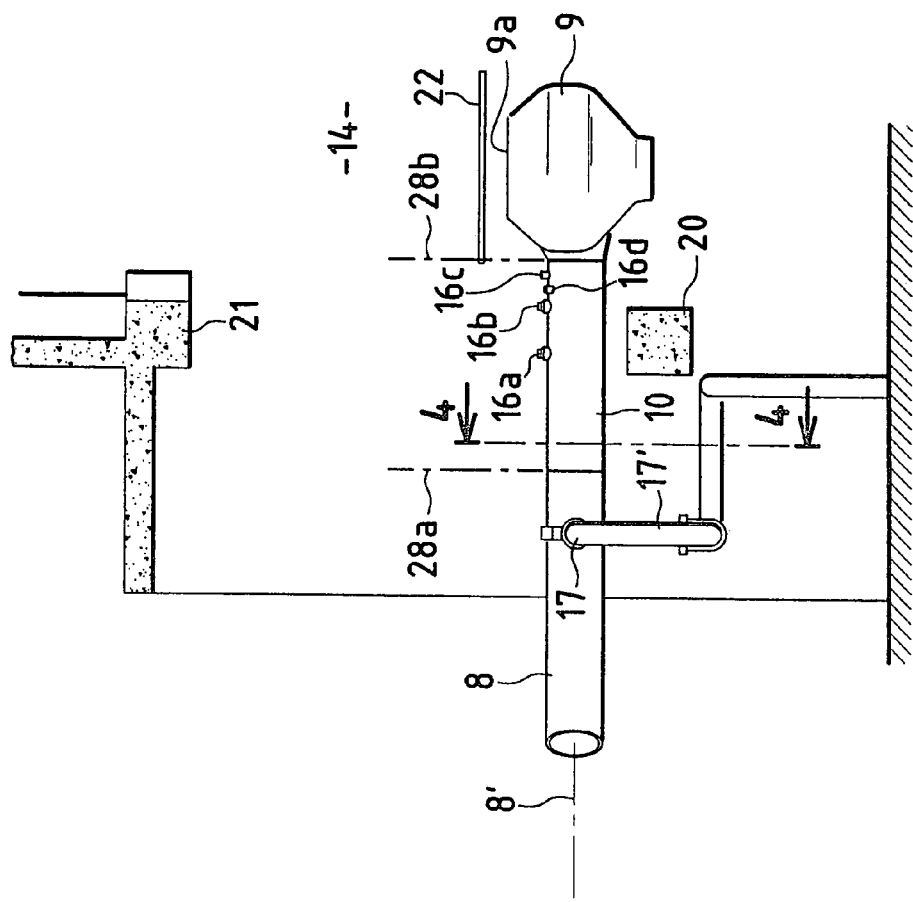
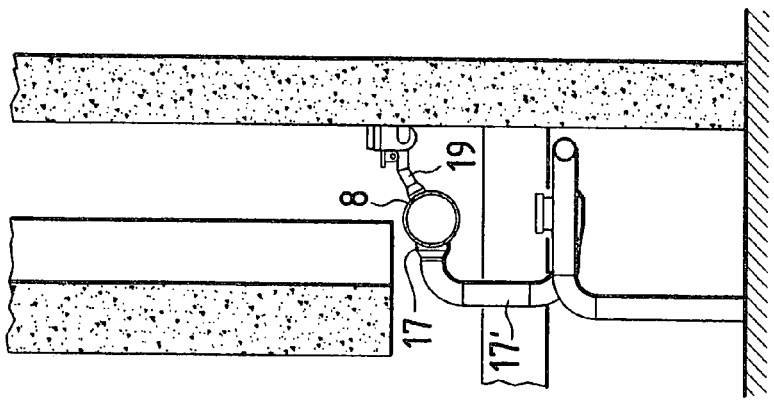
FIG.3
FIG.4

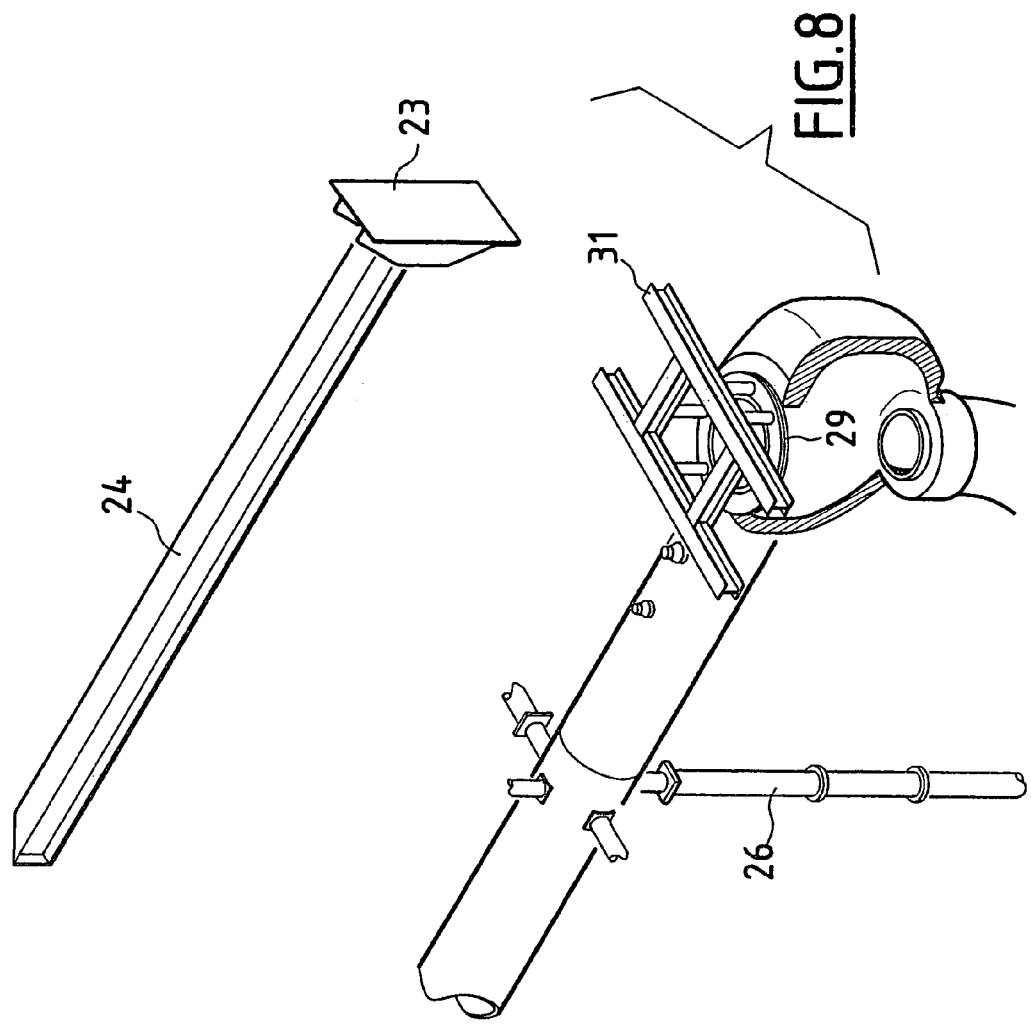
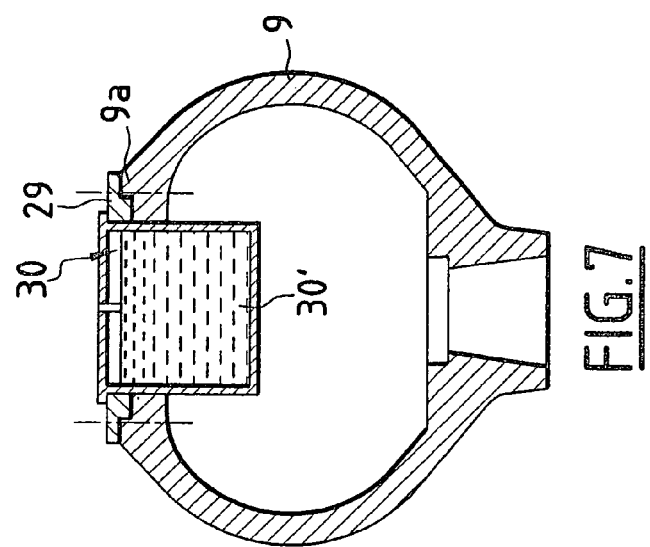

PROCEDURE AND MEANS FOR REPLACING AND PROCEDURE FOR REPAIRING A SECTION OF A PIPE IN THE PRIMARY CIRCUIT OF A NUCLEAR REACTOR

CROSS REFERENCE TO RELATED APPLICATIONS

This application is a Divisional of co-pending application Ser. No. 10/394,219, filed on Mar. 24, 2003, and for which priority is claimed under 35 U.S.C. § 120; and this application claims priority of Application No. 02 03635 filed in France on Mar. 22, 2002 under 35 U.S.C. § 119. A co-pending application is being filed concurrently herewith under application Ser. No. 11/416,181. The entire contents of all of these applications are hereby fully incorporated by reference.

TECHNICAL FIELD

The invention relates to a procedure and means for replacing a section of pipe in the primary circuit of a nuclear reactor cooled by pressurised water and in particular the replacement of a section of a cold leg in the primary circuit.

BACKGROUND TO THE INVENTION

Pressurised water reactors include a primary circuit through which circulates the water cooling the core of the nuclear reactor located within the reactor vessel so as to transfer the heat drawn from the core of the nuclear reactor to the feed water which is heated and vapourised within the steam generators. The primary circuit of a pressurised water reactor includes at least one loop and generally several loops (three or four) in each of which is provided a steam generator and a primary pump which circulates the primary coolant between the reactor vessel and the steam generator. Each of the loops in the nuclear reactor's primary circuit comprises three main large diameter pipes, each of which connect to components of the primary circuit. A first large diameter pipe, or hot leg, is connected to the vessel on the one hand and a primary part of the steam generator on the other at an inlet compartment to the water chamber of the steam generator, and transfers water heated in contact with the core in the reactor vessel to the steam generator. A second pipe, called the cross-over leg, links an outlet compartment from the water chamber of the steam generator to an inlet pipe for the volute of the primary pump. A third large diameter pipe or cold leg provides a link between the outlet pipe from the volute of the primary pump and the reactor vessel. Cooling water cooled in the steam generator and drawn in by the primary pump is delivered to the reactor vessel to cool the core through the cross-over leg, the primary pump and the cold leg.

Auxiliary and back-up circuits are associated with the primary circuit to perform particular functions, either during normal operation of the nuclear reactor, or during shutdowns, or again in the course of incidents or accidents.

In particular a chemical and volume control circuit (RCV circuit) is connected to the pipes of the primary circuit to control the quantity of water present in the primary circuit, in particular by making periodical make-up injections, and the chemical composition of the reactor cooling water, which contains various additives, by sampling the primary water and re-injecting, into the primary circuit, water containing additives in the requisite quantity to ensure the required composition of the cooling water.

Among the back-up circuits associated with the primary circuit, the safety injection circuit (RIS) injects a large flow of pressurised water into the primary circuit if there is a major water loss which cannot be compensated for by the RCV circuit.

The auxiliary and back-up circuits associated with the primary circuit comprise pipes having a very much smaller diameter than the diameter of the primary pipes, and these are connected to the pipes of the primary circuit through branch connections.

In particular, the RCV circuit, which consists of three inch (76 mm) pipe, is connected to the cold leg by a branch connection in a part of the cold leg located close to the outlet pipe from the volute of the primary pump. Water in the RCV circuit is reinjected into the primary circuit through the cold leg branch connection with the result that the inner surface of the cold leg in this reinjection area is subjected to flows of water at possibly very different temperatures depending upon the operating status of the reactor and the RCV circuit.

Some defects have been observed on the inner surface of the cold leg in these cold leg reinjection areas due to the circulation of flows of water at different temperatures, these defects being known by the name of "crazing".

Although these defects only affect a superficial part of the inner surface of the cold legs, for safety reasons it has been felt necessary to sample sections of the cold leg affected by crazing for expert assessment, and for isolated or possibly systematic replacement of cold leg sections in the light of the results of the expert assessments.

The sections of cold leg which are sampled have a first end adjacent to the outlet pipe from the volute of the primary pump and a second end providing a connection between two successive welded sections forming the cold leg. A section of this type bounded as described above is approximately 3500 mm long and includes various branch connections in addition to the branch connection for a feed pipe to the RCV circuit, in particular a branch connection to the auxiliary spray line and the spray circuit of the pressuriser which controls pressure in the primary circuit.

Conversely the section which has to be replaced does not include the connection to the RIS circuit, the cut opposite the end of the connection to the volute of the pump being made upstream of the connecting pipe to the RIS circuit.

Procedures for replacing the components of a primary circuit of a nuclear reactor and in particular procedures for replacing steam generators in which the pipes of the primary circuit are cut and the pipes of a new replacement steam generator are connected to the cut pipes of the primary circuit by welding are known. After the pipes have been cut and the connecting surfaces between the pipes and the replacement steam generator pipes have been machined, the steam generator is placed in position so that the connecting surfaces form bevels between them, through the full thickness of the pipes and branches, into which weld metal is laid on the outside of the pipes and the bevel using a process of the orbital TIG type. Generally narrow bevel welding is performed, that is to say metal is deposited on a bevel of small width, generally less than 15 mm, in which the opposite surfaces form a very small angle, less than 5°, between them.

Where such a component replacement is made, the welds are made under conditions which are the same as those used when a steam generator is initially fitted and they do not therefore have any special features which require additional inspection or machining over and above those performed in the operation of incorporating a steam generator into a nuclear power station when under construction.

Conditions are completely different when a section of pipe, and in particular a section of a cold leg, is replaced in the primary circuit which is an operation involving restoration of part of the pipe itself.

Hitherto no procedure and means have been known to ensure optimum conditions for replacing a section of a primary pipe.

SUMMARY OF THE INVENTION

The purpose of the invention is therefore to provide a procedure for replacing a section of the primary circuit pipe of a nuclear reactor cooled by pressurised water connecting a first and a second component in the primary circuit of the nuclear reactor in which identification of the cuts which have to be made, cutting of the section at its ends, removal of the section, bevelling of the joining ends of the part remaining after the section of the primary circuit pipe has been cut out, adjustment of the new replacement section for length and bevelling of the joining ends of the new replacement section, and fitting and bevel welding the joining ends of the replacement section to the ends of the remaining parts of the pipe are effected from outside the pipe, this process ensuring perfect quality in the junction zones of the replacement section.

With this object machining and inspection of an inner part of the joining ends which are welded together is also carried out within the pipe, by remote control and by remote operation or in a programmed way, by introducing and inserting means for working within the pipe from one of the first and second components of the primary circuit.

The invention also relates to a procedure for the repair of a defective section of pipe in the primary circuit of a nuclear reactor cooled by pressurised water connecting a first and a second component of the primary circuit of the nuclear reactor, wherein the work of inspection, machining and filling by welding is also carried out within the pipe, by remote control and remote manipulation or in a programmed way, by introducing and inserting means for working within the pipe from one of the first and second components of the primary circuit.

Finally the invention relates to means which make it possible to implement the procedure according to the invention, in particular for carrying out the operations of machining by grinding, inspection and if necessary repair of the junction zones of a replacement section for a primary circuit pipe of a pressurised water reactor.

BRIEF DESCRIPTION OF DRAWINGS

For a proper understanding of the invention a procedure for replacing a section of a cold leg in the primary circuit of a nuclear reactor cooled by pressurised water and means which can be used to effect machining and inspection within the pipe for implementing the procedure according to the invention will now be described by way of example with reference to the appended figures.

FIG. 3 is a simplified view in elevation of the primary pump and the section of the cold leg of the primary circuit which has to be replaced.

FIG. 4 is a cross-section view in a vertical plane along 4-4 in FIG. 3.

FIG. 7 is a view in cross-section of the volute of the primary pump during an initial stage of the replacement procedure according to the invention.

FIG. 8 is a diagrammatical exploded perspective view showing the handling means located above the volute of the primary pump for implementing the procedure according to the invention.

DESCRIPTION OF PREFERRED EMBODIMENT

Figure 1:
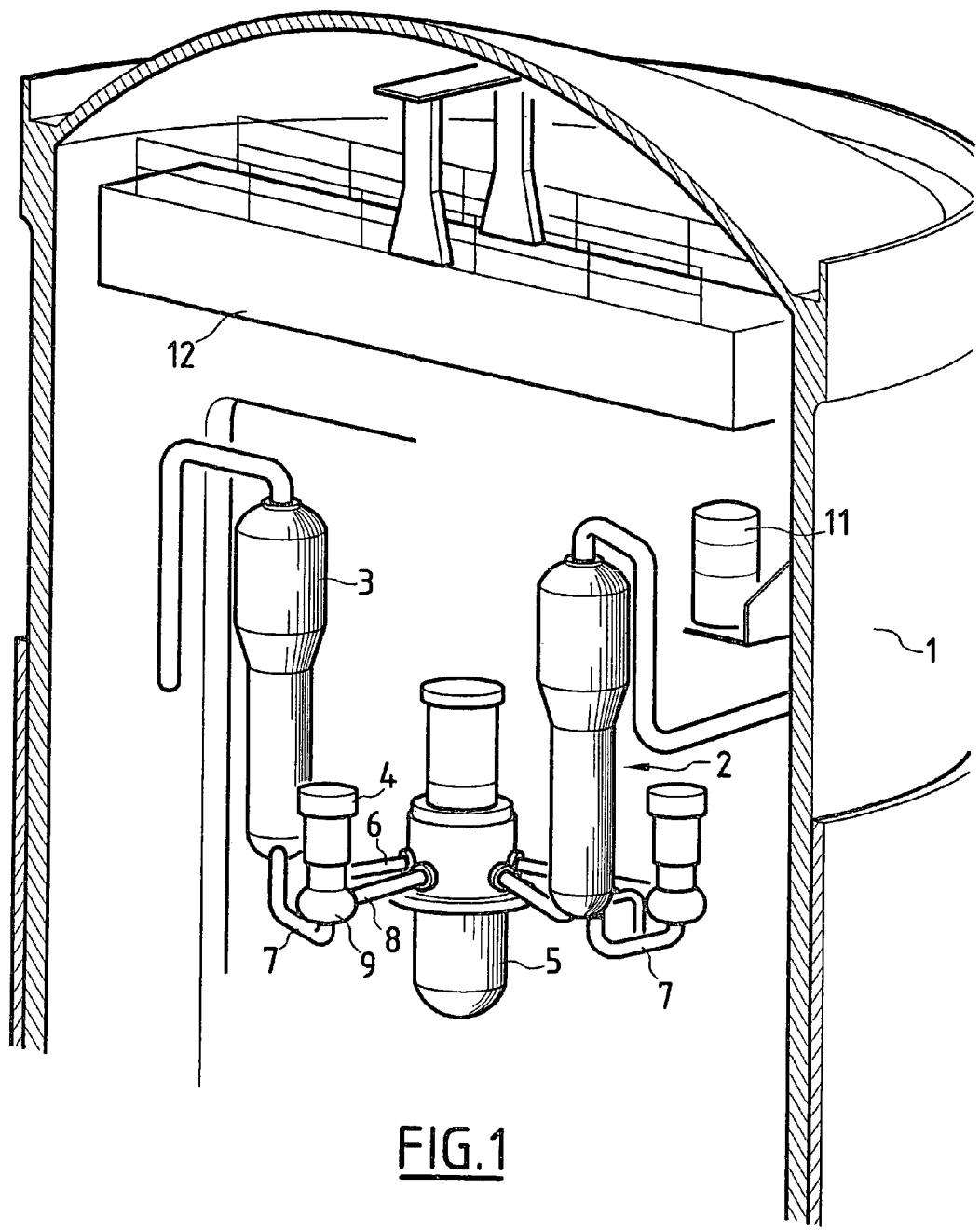
FIG. 1 is an exploded perspective view of the safety containment and the primary circuit of a pressurised water reactor.

FIG. 1 shows the containment building 1 of a pressurised water reactor housing primary circuit 2 which in the situation illustrated in FIG. 1 is a circuit having three loops, each of the loops having connecting pipes from a steam generator 3 and a primary pump 4 to reactor vessel 5 enclosing the core comprising fuel assemblies.

Each of the loops in the primary circuit has a first pipe 6, called the hot leg, which provides a link between the reactor vessel and the inlet to the primary part of steam generator 3, a second pipe 7, or cross-over leg, providing a link between the outlet from the primary part of steam generator 3 and the inlet to volute 9 of primary pump 4, and a third pipe 8, or cold leg, providing a link between the delivery outlet from volute 9 of the primary pump and the reactor vessel.

Water cooling the reactor circulates within the vessel in contact with the core assemblies, which causes it to be heated. The heated water is delivered by hot legs such as 6 to the primary part of the steam generator to be distributed to the exchanger tubes of the steam generator bringing about the heating and vapourisation of secondary feed water and cooling of the primary water. The cooled primary water is recovered in the outlet part of a water chamber of the steam generator, and then via cross-over legs 7 in which the cooling water is drawn along by primary pump 4. The cooling water drawn into volute 9 of the primary pump is delivered to cold leg 8 through the delivery pipe of volute 9 to be reintroduced into a part of the vessel which ensures that cooling water is delivered to the core of the nuclear reactor.

Above volute 9, in which the pump's impeller is fitted, the primary pump has a drive assembly for the pump impeller comprising an electric motor and means for cooling and insulating the motor.

On one of the loops the primary circuit also has a pressuriser 11 which ensures that the pressure and temperature of the cooling water in the primary circuit are maintained. The water in the primary circuit is at a pressure of the order of 155 bars and a temperature of 320° C. while the nuclear reactor is in operation.

The reactor building, within safety containment 1, incorporates different means of access to the components of the primary circuit and different handling means such as revolving crane 12 which is revolvingly mounted on a circular beam to the top of the reactor building.

Figure 2:
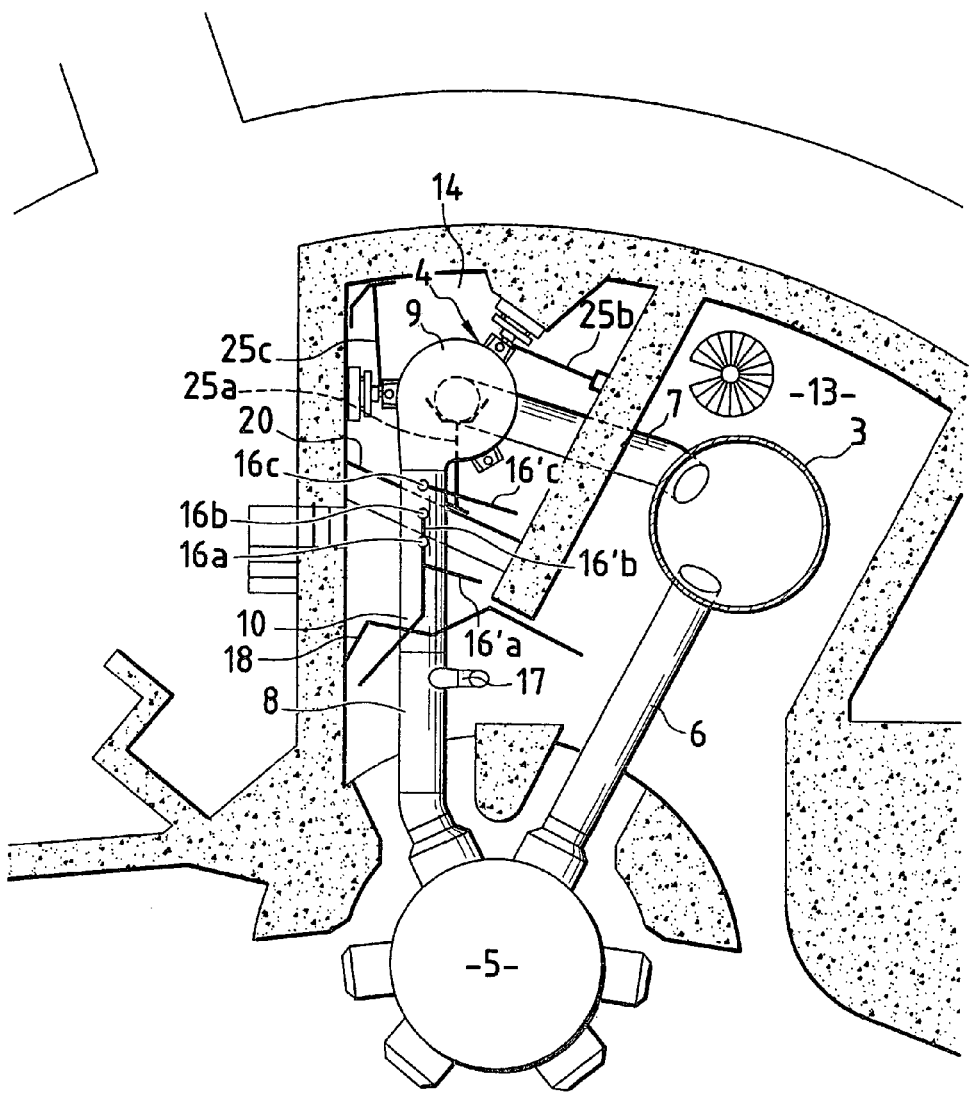
FIG. 2 is a view in cross-section along a horizontal plane of a loop of the primary circuit of the nuclear reactor.

FIG. 2 shows in plan view and horizontal cross-section part of the primary circuit comprising the loop in which a section 10 of primary leg 8 has to be replaced, and the concrete bunkers, 13 and 14 respectively, bounded by concrete walls within the reactor building within which steam generator 3 and primary pump 4 in the loop of the primary circuit are housed. Hot leg 6, cross-over leg 7 and cold leg 8 connecting the outlet of the primary pump to reactor vessel 5 are shown in plan.

FIG. 2 also shows the pipes of the auxiliary or back-up circuits of the nuclear reactor which are connected to the cold leg at a branch connection or which follow a route passing above the cold leg.

At least some of these pipes in the nuclear reactor's auxiliary and back-up circuits will have to be cut in order to allow section 10 of the nuclear reactor's cold leg to be replaced.

In the cold leg three branch connections 16a, 16b and 16c which make connections between the pipes of the auxiliary and back-up circuits and cold leg 8 are located at the top of the cold leg in the vicinity of the pipe connecting to volute 9 of the primary pump.

Branch connection 16a provides a connection to a three inch diameter line of the chemical and volume control (RCV) circuit of the nuclear reactor. Branch connection 16b provides a connection for a pressuriser spray line of the nuclear reactor having a diameter of four inches and branch connection 16c provides a connection to a two inch diameter line providing a by-pass between cross-over leg 7 and cold leg 8.

Branch connection 16a connected to the pipe of the RCV circuit is used to reintroduce water which has been processed in the RCV circuit into the primary circuit. The injection of a flow of water into the cold leg at a temperature which is different from the operating temperature of the primary circuit can give rise to some deterioration, such as crazing of the inner surface of the cold leg in the part close to branch connection 16a, as a result of which it may be necessary to remove a section 10 from the cold leg extending on either side of branch connection 16a for expert examination, the results of which examination may result in the systematic replacement of sections of the cold legs in a set of nuclear reactors.

A branch connection 17 of a size substantially larger than branch connections 16a, 16b and 16c is also attached to the cold leg to provide a connection for a pipe of the reactor safety injection circuit which has a diameter of 12 inches (approximately 300 mm).

Section 10 which is to be replaced in the cold leg generally lies between the delivery pipe of volute 9 of the primary pump to which the cold leg is connected and a part of the cold leg located slightly upstream from branch connection 17 for the safety injection circuit. The second end part of section 10 is selected in such a way that branch connection 17 for the safety injection circuit lies on a remaining part of the cold leg and cutting and remachining of the connecting end of the remaining part are carried out in a zone in which two parts of the cold leg are connected by welding. In this situation the length of the cold leg which has to be replaced is approximately 3500 mm long, this length making it possible to replace the entire zone of the cold leg which is likely to have suffered damage through crazing of its inner surface.

The pipes in the auxiliary circuits of the nuclear reactor which interfere with the procedure for replacing section 10 of the cold leg also include a pipe 18 of the RCV circuit whose path runs over one end of section 10 which is to be replaced.

The pipes in the primary circuit and the pipes in the auxiliary and back-up circuits are protected and thermally insulated and in particular are surrounded by lagging. Before any work can be done on the primary circuit and on the pipes of the auxiliary and back-up circuits all the lagging around the cold leg and the auxiliary and back-up pipes mentioned above has to be dismantled in a first stage of the replacement procedure according to the invention.

It is also necessary to ensure that the lagging surrounding the primary motor/pump unit comprising the volute and the drive motor of primary pump 4 is dismantled.

These operations for starting the replacement procedure according to the invention are carried out after cold shutdown of the nuclear reactor, the primary circuit being filled with cooling water at a temperature which is the ambient temperature of the reactor building.

Before carrying out the work on the nuclear reactor according to the invention, the reactor site is provided with all the components which have to be replaced in the auxiliary and back-up circuits, and in particular the seals. All scaffolding necessary for work in bunkers 13 and 14 of the reactor building is also installed.

Various operations are also necessary to ensure that the electrical cables and in particular the measurement cables connected to probes or sensors in the primary circuit in the zone being worked on are disconnected.

The positions of the various pipes on which work has to be carried out and the volute of the primary pump are surveyed by a topographic survey.

Figure 5:
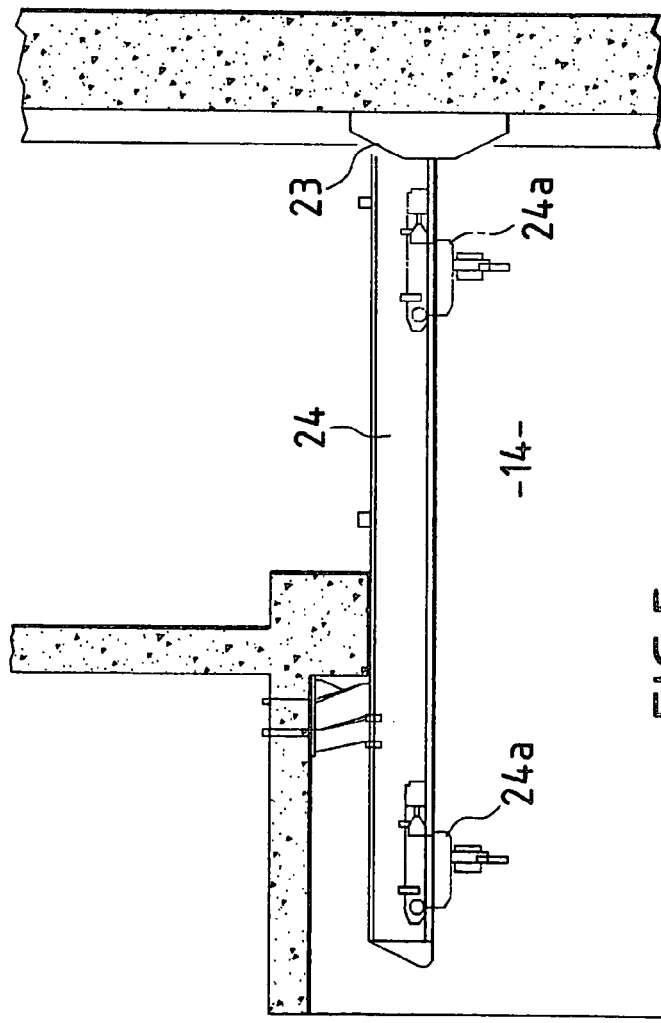
FIG. 5 is a view in vertical cross-section of the top of the primary pump bunker beneath which lifting and handling means are located to implement the procedure according to the invention.

FIGS. 3 and 4 illustrate the environment in which work has to be done on cold leg 8 within bunker 14 for primary pump 4. The primary pump has been illustrated only as the shape of volute 9, the drive motor unit and the pump impeller having been dismantled so that the top of primary pump 9 comprises the plane of the horizontal joint 9a of volute 9. For simplification, the cross-over leg connected to the inlet pipe of volute 9 is also not shown. At the top of bunker 14 the reactor building has a concrete wall 21 which will be used for the attachment of handling means for implementing the procedure according to the invention, as illustrated in FIG. 5. A concrete beam 20 of the reactor building which is in a horizontal position is also located above a part of the cold leg, in the vicinity of branch connections 16a and 16b.

The part of the cold leg facing the exit from primary pump bunker 14 includes a branch connection 17 providing a connection to injection line 17' and a second branch connection 19 for a pipe of the safety injection circuit.

Various floors or floor gratings are located within space 14 and in particular a platform 22 is provided above the joint plane 9a of volute 9 of the primary pump.

As can be seen in FIG. 5, a monorail 24 is secured in a horizontal position above the primary pump through a plate 23, and on this monorail is fitted a hoist 24a which can lift and convey loads of a mass up to 10 tonnes within primary pump room 14. Monorail 24, which is parallel to cold leg 8 and which is located vertically above the cold leg, comprises a cantilevered portion above the exit from primary pump room 14, so that the monorail will allow hoist 24a which is mounted on a carriage to move along beam 24 to the end of beam 24 constituting the monorail vertically above the end of section 10 of cold leg 8 which has to be replaced.

Hoist 24a and monorail 24, having a capacity of 10 tonnes, in particular make it possible to handle the section of the cold leg which has to be replaced. After monorail 24 has been fitted, tests are performed to check that it is in satisfactory working order and will bear to the loads which will have to be handled.

The auxiliary and back-up lines of the reactor circuit connected to the cold leg or located in the vicinity of the cold leg are then supported and the positions of the cuts which have to be made on these auxiliary and back-up lines are then marked before cutting with an automatic cutting machine.

In particular pipe 18 passing over cold leg 8 is cut to permit subsequent operations for the support of cold leg 8.

After making cuts in the auxiliary and back-up pipes which are necessary in order to implement the procedure according to the invention, the cut ends are then blanked off to prevent any cooling water from exiting via the cut zones, the primary circuit being still full of cooling water.

After making measurements, the replacement pipe sections for the auxiliary and back-up circuits are prefabricated.

A dimensional survey is then carried out on the part of the primary circuit on which the work is to be done, and in particular on the cold leg, and the cold leg is supported in the position identified by the topographic survey.

Figure 6:
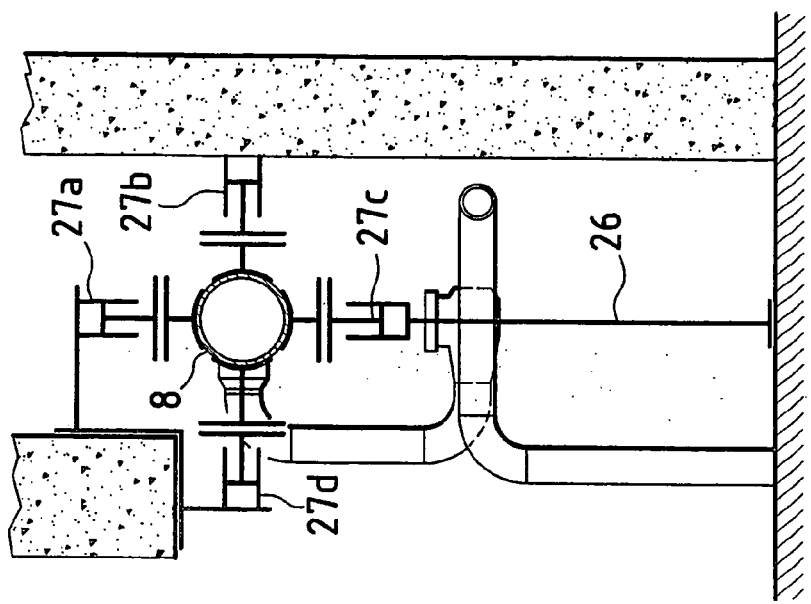
FIG. 6 is a view in vertical cross-section illustrating the supports on the cold leg for implementing the procedure according to the invention.

FIGS. 2 and 6 show the elements supporting the cold leg which in particular comprise horizontal supporting columns and supporting members 25a, 25b and 25c shown in FIG. 2 which support volute 9 of the primary pump in position.

FIG. 6 shows the supporting components for cold leg 8, at the end of section 10 which has to be replaced, comprising a supporting column 26 and supporting members 27a, 27b, 27c and 27d. Supporting members 27a, 27b, 27c and 27d and supporting column 26 are located in a zone of cold leg 8 which is slightly upstream from branch connection 17 and pipe 17' of the RIS circuit and slightly downstream from the welded zone of these two parts of the cold leg in the vicinity of which one of the cuts in the section which has to be replaced will be made.

Supporting members 25a and 25c for volute 9 of the primary pump provide support in the direction of the cold leg and member 25b provides support in a direction at a high inclination in relation to the direction of the cold leg. The supporting members are supported on the concrete walls of primary pump room 14 or on beam 20 which passes beneath the cold leg. Supporting member 25 a which is placed between concrete beam 20 and the connection of cross-over leg 7 of the primary circuit make it possible to move the pump volute in the direction of the cold leg.

The components wedging the volute of the primary pump are dismantled and a supporting jack is fitted beneath cold leg 8 bearing on beam 20.

A very accurate determination of the cuts which have to be made is then performed, for example using a highly accurate metrology tool.

The locations of the cuts which have to be made in order to separate the section 10 of cold leg 8 which has to be replaced are illustrated in FIG. 3.

A first cut 28a has to be made in the weld zone between the two sections making up the cold leg and a second cut 28b has to be made in the connecting plane between cold leg 8 and the delivery pipe of volute 9 of the primary pump.

The cutting planes are marked on the cold leg, in an orientation at right angles to axis 8' of cold leg 8.

A new replacement section of cold leg 8 of the primary circuit approximately 350 mm long, fitted with branch connections similar to branch connections 16a, 16b and 16c in the section of cold branch 8 which has to be replaced and a temperature sensor boss 16d having a diameter of 1 inch located between branch connections 16b and 16c, is then provided.

Branch connection 16a is constructed by forging the wall of replacement section 10 for cold leg 8 and branch connections 16b and 16c and boss 16d are positioned on and welded to the new replacement section 10 of cold leg 8.

An orbital cutting machine of the standard type is used to make the cuts on the cold leg. This standard cutting machine is normally used to connect pipes of the primary circuit with narrow bevel welding, this cutting machine being generally called a mobile narrow bevel machining unit. All the pipes or ducting which might impede the work of cutting out and removing the section of the cold leg which has to be replaced are then cut and removed, and then the primary circuit is drained. The work of cutting the section of the cold leg which has to be replaced is carried out with the supporting components for the pump volute and the cold leg in place.

The cutting machine of the standard type is placed on the primary leg in the cutting plane 28a, on the side of the weld between the two sections of cold leg 8.

As illustrated in FIG. 7, various operations are performed on the top of volute 9 of the primary pump at the level of joint plane 9a. First of all a survey is performed to check that the joint plane of pump volute 9 is horizontal, then an interface ring 29 is fitted to protect the plane of the volute joint and to provide further support for the components required when implementing the procedure according to the invention.

A cover 30 which is of one piece with a water-filled container 30' designed to provide biological protection for the personnel working above the top opening of volute 9 of the primary pump is fitted onto interface ring 29.

As can be seen in FIG. 8, a transfer surface 31 incorporating a horizontal frame which provides for the movement of loadbearing carriages is fitted above the pump volute on interface ring 29. A container which is designed to collect radioactive material originating from the cuts made in the various pipes and ducts is also fitted on transfer surface 31.

A topographic survey of all the pipes in the auxiliary and back-up circuits which have not yet been cut is then performed and the cuts which are to be made are accurately marked out. The cuts are made and the cut sections, which can be placed in the container, are removed. The cutting lines on the pipes in the auxiliary and back-up circuits are established on the basis of the parts of these pipes which will be recovered and the parts which will actually be replaced.

After the cuts have been made in the auxiliary and stand-by circuit pipes they are blanked off and then the pipe ends to which the replacement sections will be connected by welding are bevelled.

A platform 22 is fitted above the volute of the primary pump and section 10 of the cold leg which has to be replaced is then cut along cutting plane 28a on the side of the weld of the cold leg sections.

Containment is provided for the cut zone of the cold leg and supporting members are welded to the remaining part of the cold leg on the side of reactor vessel 5.

The cutting machine is mounted on cutting plane 28b on the side of volute 9 of the primary pump and the second cut is made in section 10 which has to be replaced. Containment is also provided for the second cutting zone.

Hoist 24a of monorail 24 is located above section 10, which is slung onto the lifting cable of the hoist.

A storage container for section 10 of the primary leg which has to be replaced is then brought into the reactor building and the container is set down on transfer surface 31 resting on the volute of the primary pump. The storage container is moved laterally to bring it into line with the axis 8' of cold leg 8, vertically above section 10 which has to be replaced.

Section 10 which has been cut out is lifted using hoist 24a of monorail 24 and cut section 10 is moved laterally above transfer surface 31. Section 10 of the cold leg is placed in the storage container resting on transfer surface 31. The ends of section 10 cut from the cold leg can be blanked off to provide biological protection and temporary containment and lead sheeting providing biological protection can be placed on the section to confine the section within the storage container. The container is moved laterally on the transfer surface by a distance of approximately 400 mm and the lid of the container is fitted, closed and locked. The section confined in the container is removed from the nuclear reactor using polar crane 12. The supporting jack for the section located on concrete beam 20 is removed. The worn-out section is removed from the reactor building and the cutting machines are also removed from the spaces in the reactor building.

The remaining parts of the cold leg on the vessel side and on the primary pump piping side can be temporarily blanked off.

The ends of the remaining part of the cold leg on the vessel side and the primary pump delivery pipe side are then decontaminated, together with the inner surface of the volute. For this purpose temporary blanking off means are fitted to the remaining part of the cold leg on the reactor vessel side and the pipes of the volute. Decontamination containment is then placed around the components which have to be decontaminated and a chemical etching solution is caused to circulate in contact with the surfaces requiring decontamination.

Figure 9:
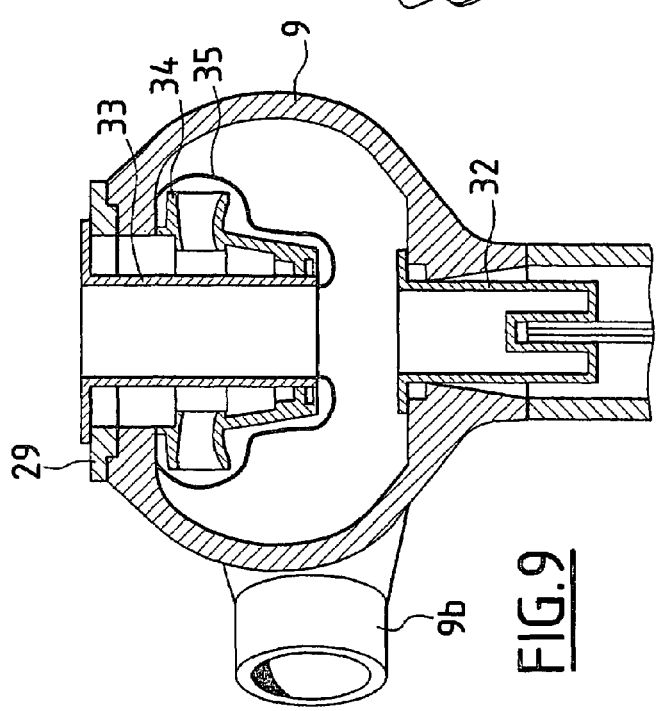
FIG. 9 is a view in cross-section through a vertical plane of the volute of the primary pump fitted out for implementation of the procedure according to the invention through the inside of the volute of the primary pump and the cold leg.

After decontamination the decontamination containment is dismantled together with the temporary blanking off means for the cold leg and the volute and, as shown in FIG. 9, a protective basket 32 is fitted within the volute in the suction pipe of the primary pump.

A final operation to decontaminate the inner surface of the volute is then performed by hand.

After all the equipment required for decontamination has been dismantled and removed a pipe 33 providing biological protection and mechanical protection for the surfaces of the volute is fitted into the inner part of diffuser 34 of the primary pump to form an access opening through the top of the volute of the vertical axis pump.

Vinyl containment 35 is also placed around diffuser 34 to ensure its containment.

Dose monitoring is performed to determine whether it is possible to gain access to the site for further operations.

The ends of the remaining parts of the cold leg are inspected by radiography. Any repairs are made by filling if there are any defects or lack of thickness in the parts.

A machine for bevelling pipe ends is then located on the end of the remaining part of the cold leg on the vessel side and a bevel is made on this end, which will form one of the two narrow bevel surfaces for welding the end of the replacement section. A check is made to ensure that the original weld between the two sections of the cold leg where the cut was made along cutting plane 28a has been completely removed.

A bevel is then made on the delivery pipe of the primary pump volute and a dimensional check is then made on the two bevels using penetrating dye.

After the bevelling machines (BM) have been removed, means to isolate the connecting ends of the remaining parts of the cold leg are fitted on the vessel side and the primary pump volute side.

It is then a question of fitting and welding a new section of the primary leg, similar to section 10 which has been cut out and removed, into position and welding it to the ends of the remaining parts of the primary leg. As indicated above, the new section incorporates branch connections for the auxiliary and back-up circuit pipes connected to the section of the cold leg and is of excess length in comparison with the section which has to be replaced.

Reference and measurement operations are first of all performed.

A target-holding jig is located on each of the machined bevels of the remaining parts of the cold leg, on the vessel side and the volute side. A topographical survey of the relative initial positions of the two bevels is performed. The volute of the primary pump is moved to a theoretical abutting position, taking into account the predetermined welding shrinkage for each of the welds.

A second topographical survey of the relative positions of the bevels is performed.

Two supporting and guide rings are then fitted onto the ends of the remaining parts of the cold leg and a topographical survey is made of the new replacement section.

To begin with the new replacement section is adjusted for length on the basis of the topographical survey of the relative positions of the bevels on the remaining parts of the cold leg. Bevels are machined at the ends of the new replacement section so that the bevelled surfaces made form two narrow connecting bevels for replacement section 10 with the bevelled surfaces of the ends of the remaining parts of the cold leg when the replacement section is fitted into place.

After the end bevels of the replacement section have been machined, the new replacement section which is equipped with a supporting and guide ring at each end is placed in position. The volute of the pump is placed in the abutting position using the supporting device described above. Before being fitted into place the new replacement section is equipped with internal means to provide an argon chamber for welding.

Figure 10A:
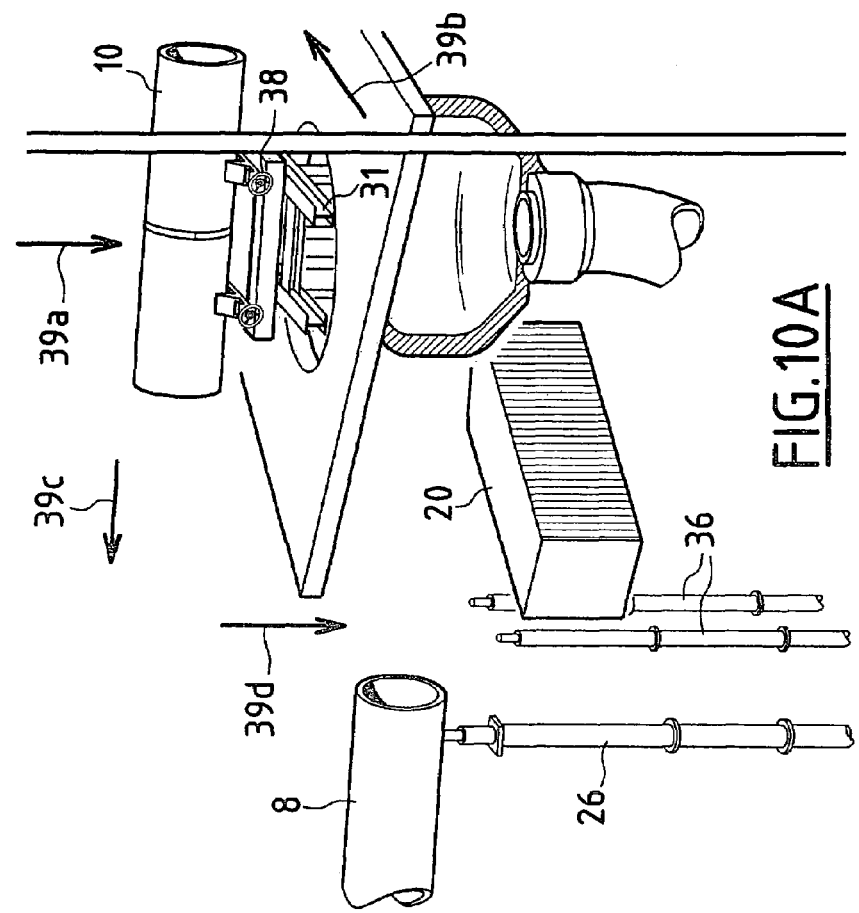
FIG. 10A is a diagrammatical perspective view illustrating the handling operations required for fitting the new replacement length of the cold leg in the primary circuit.
Figure 10B:
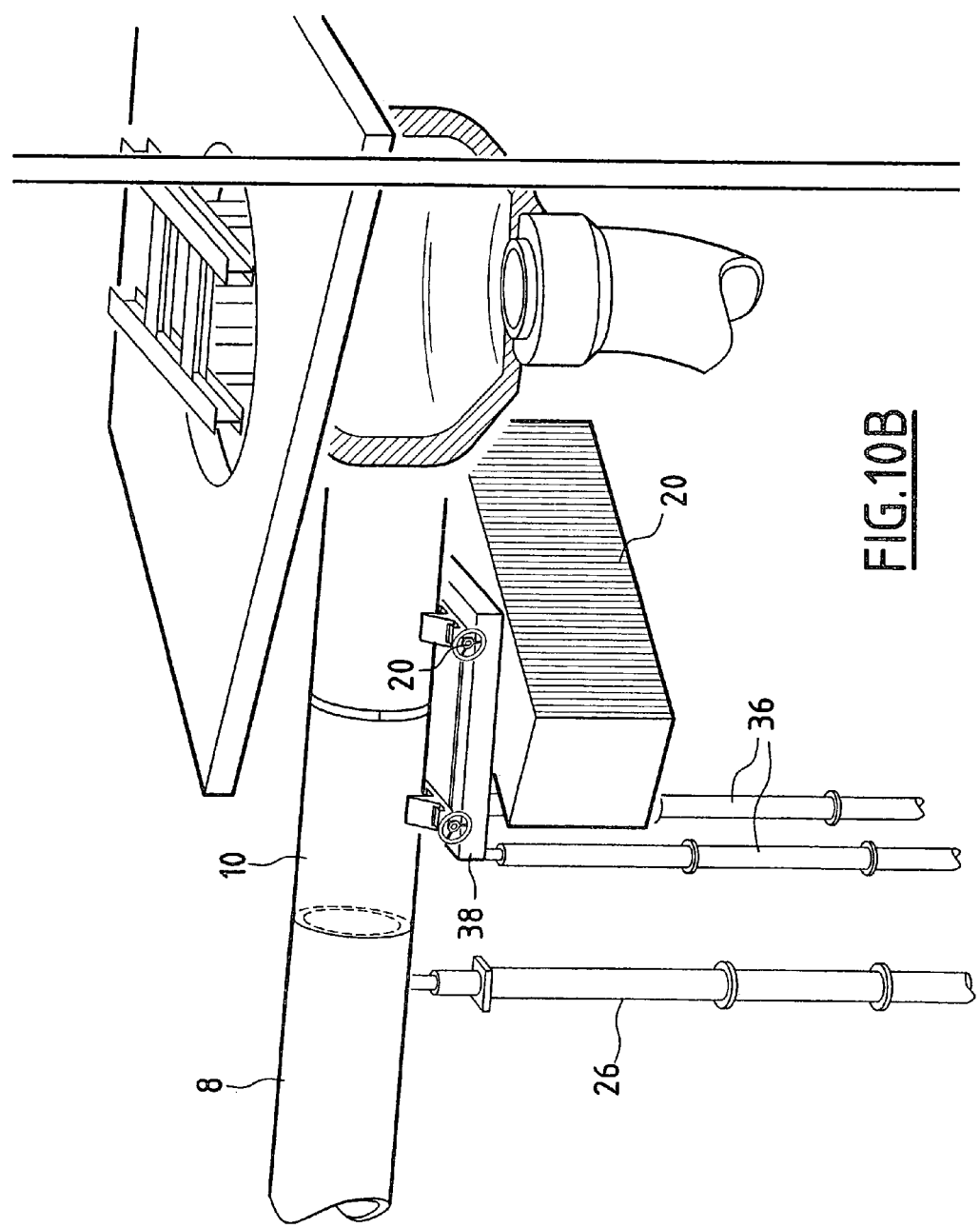
FIG. 10B is an exploded perspective view illustrating a further stage in the fitting of the replacement section of the cold leg.

As can be seen in FIGS. 10A and 10B, two supporting struts 36 which are held in place by a plate 36' fixed to beam 20 (see in particular FIG. 11) are positioned beneath the zone where the new replacement section of the cold leg will be received close to concrete beam 20.

The rest of the primary leg is supported by supporting strut 26 which was first placed in position together with supporting means 27.

As can be seen in FIG. 10A, the new replacement section 10 is lowered into the reactor building from an entry airlock into the reactor building by the rotating crane as shown by arrow 39a, until it rests on a docking surface 38 set down on transfer surface 31.

The docking surface is then moved laterally (arrow 39*b*) to place new replacement section 10 in axial alignment with the remaining parts of primary leg 8.

The new replacement section is of one piece with a cradle of docking surface 38.

Figure 11:
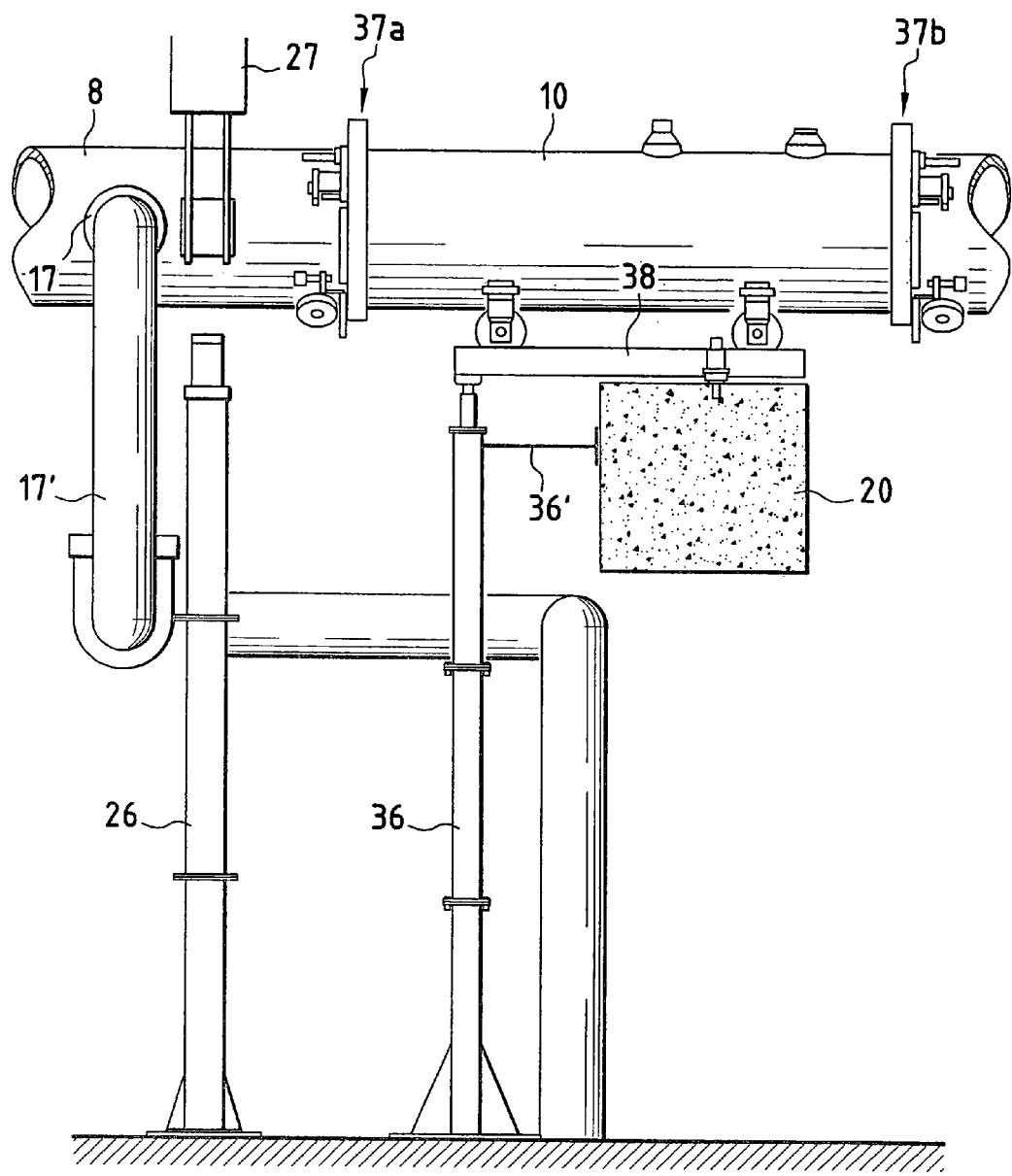
FIG. 11 is a side view in elevation and partial cross-section showing the devices for holding the new replacement section of the cold leg for welding the replacement section.

The unit comprising the new replacement length, the cradle and docking surface is picked up using hoist 24*a* to set it down on struts 36 and beam 20 as shown in FIGS. 10B and 11. The corresponding movements are shown by arrows 39*c* and 39*d* in FIG. 10A. Volute 9 of the primary pump is moved by a maximum amount established by calculation to ensure that the new replacement section can be inserted. The connecting ends of the new replacement section and the ends of the remaining parts of the cold leg are accurately offered up to each other. The new replacement section of the cold leg which, as shown in FIG. 11, includes supporting and guide rings 37*a* and 37*b* respectively at each end is adjusted and secured in position.

The means supporting pump volute 9 are released for adjustment and final positioning.

Replacement section 10 is placed and secured in position as shown in FIG. 11.

The ends of replacement section 10 are then welded to the ends of the cold leg which have remained in situ using a narrow bevel orbital TIG (NBOT) welding procedure.

As shown in FIG. 11, the NBOT welding machine is positioned and adjusted on each of supporting and guide rings 37*a*, 37*b* at the ends of replacement section 10.

The two ends of the replacement section are then welded to a thickness corresponding to a fraction of the total thickness of the primary pipe forming the cold leg, by partial filling of the narrow bevels with weld metal, the welded thickness being for example from 15 mm to 25 mm. Shrinkage at the joints is monitored by moving volute 9 with the help of the supporting means throughout the welding operation.

After the new replacement section has been partly welded at its ends, topographic surveys of the positions of the bevels, the branch pipes and unconnected pipes of the auxiliary and back-up circuits of the nuclear reactor are performed so that the replacement pipes can be adjusted for length.

Any means which may be within the cold leg on the primary pump side are dismantled to leave space available for inserting a machine for carrying out work within the cold leg.

In fact, as indicated above, in order to obtain a perfect condition of the internal surface of the primary leg at the welds connecting the replacement section it is necessary to perform a grinding machining operation on the inner part of the joint welds, within the primary leg, using means whose movements and positioning are remote controlled and which are preprogrammed to carry out a grinding operation on the inner part of the joining welds.

Figure 12:
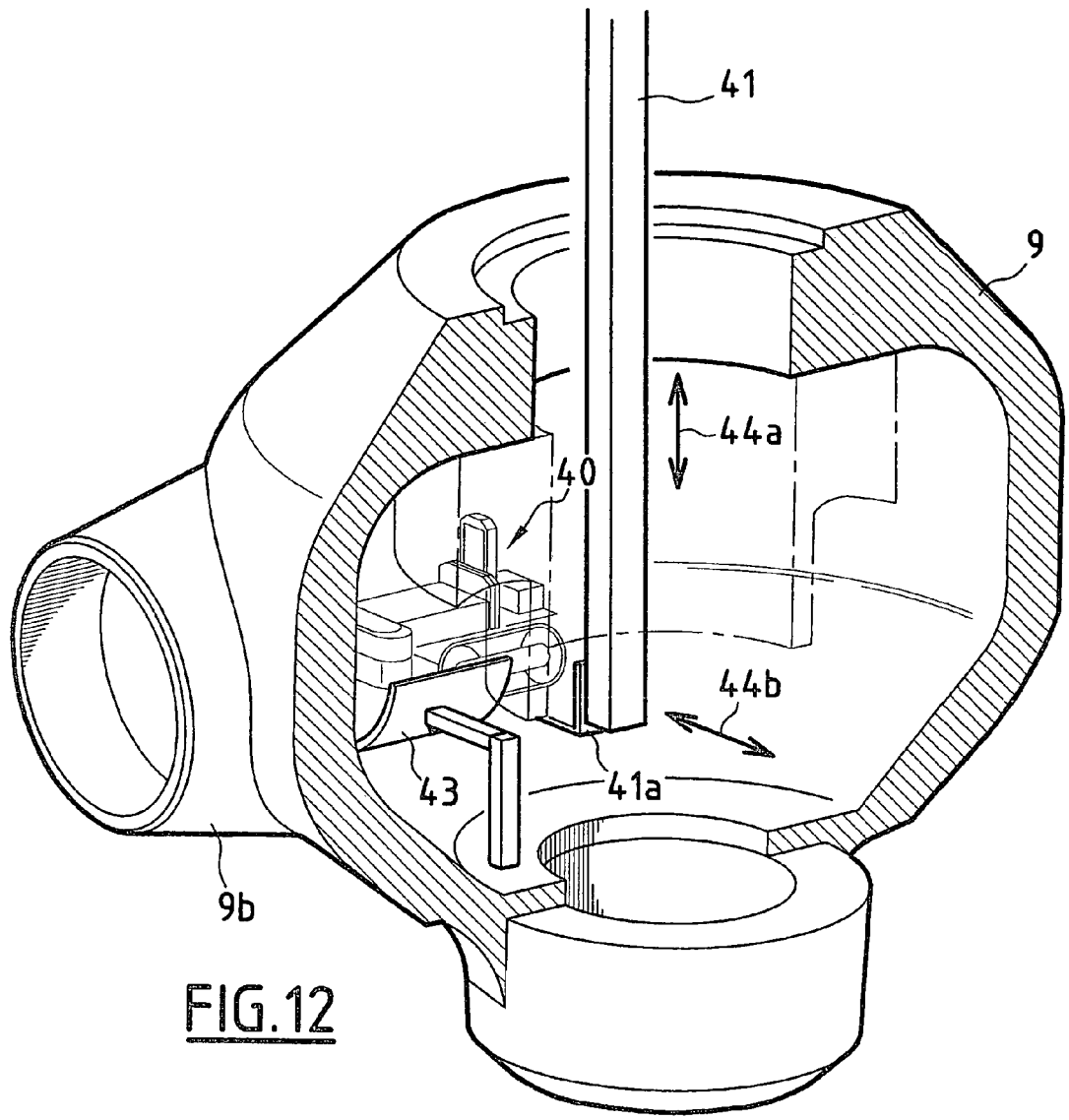
FIG. 12 is a diagrammatical exploded view in perspective illustrating an operation of inserting means for working within the cold leg from the volute of the primary pump.
Figure 13:
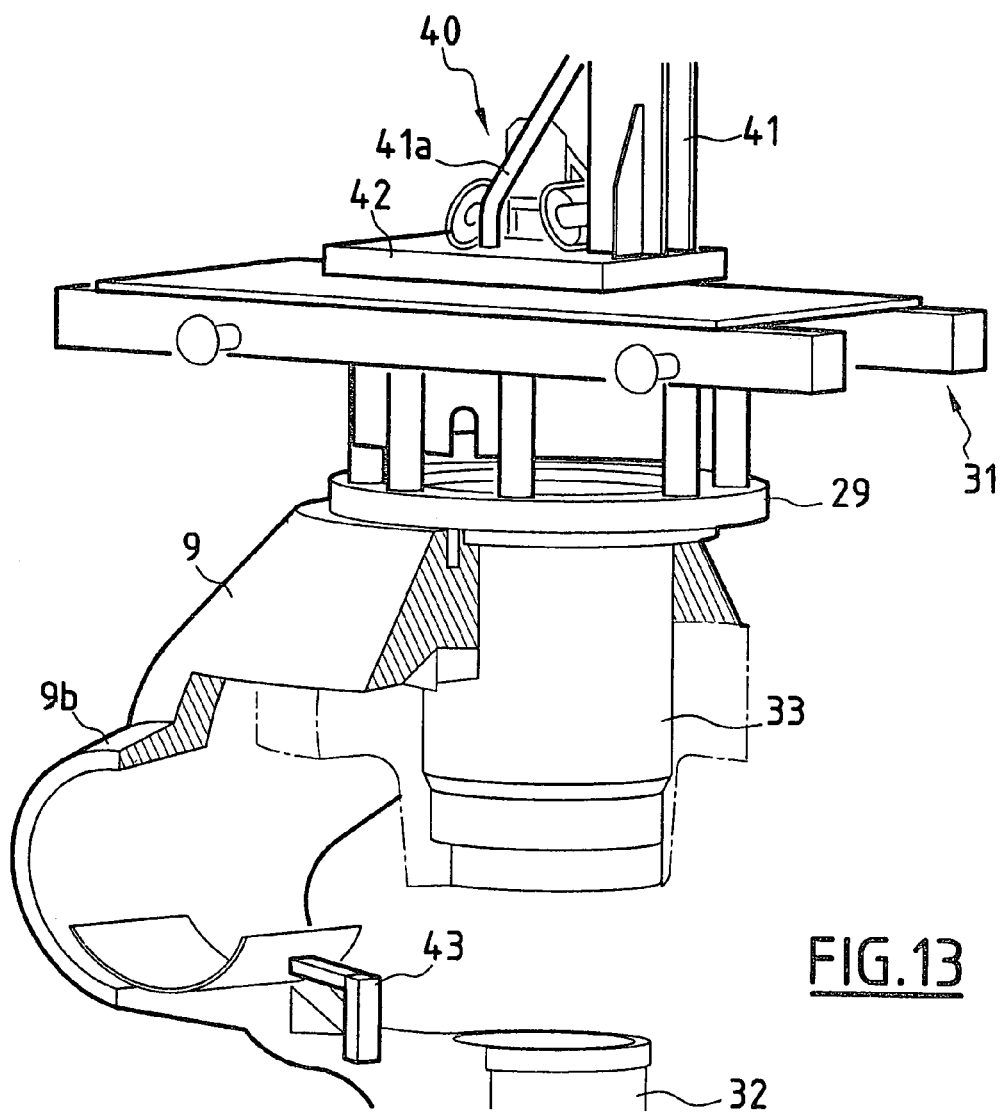
FIG. 13 is an exploded perspective view of the volute of the primary pump showing the protection and guidance and support means for inserting the means for working within the cold leg from the primary pump.

FIGS. 12 and 13 show the components located above or within the volute which make it possible to insert and move means for working within the cold leg of the primary circuit in which the new replacement section has been partly welded.

FIGS. 12 and 13 show volute 9 the primary pump into which means 40 for carrying out work are inserted into the delivery pipe 9*b* of volute 9 to which the replacement section (not shown) is connected by a partial weld.

As indicated above, a protective pipe 33 which rests on interface ring 29 at the top of volute 9 has been fitted within diffuser 34 of the pump. A protective basket 32 has also been fitted in the suction pipe of the volute. Transfer surface 31 rests on interface ring 29 and permits movement in a horizontal direction by a lift 41 carried by a moving table 42 moving in a direction in the horizontal plane parallel to the cold leg. A gangway 43 to receive means 40 for carrying out work has also been fitted within the volute so as to extend the lower surface of the inlet part of pipe 9*b* communicating with the cold leg. Means 40 for carrying out work supported by a supporting plate of lift 41 is positioned on gangway 43 at the inlet to pipe 9*b* by vertical movements of lift 41 and horizontal movements of table 42, as shown by double arrows 44*a* and 44*b*.

Figure 14A:
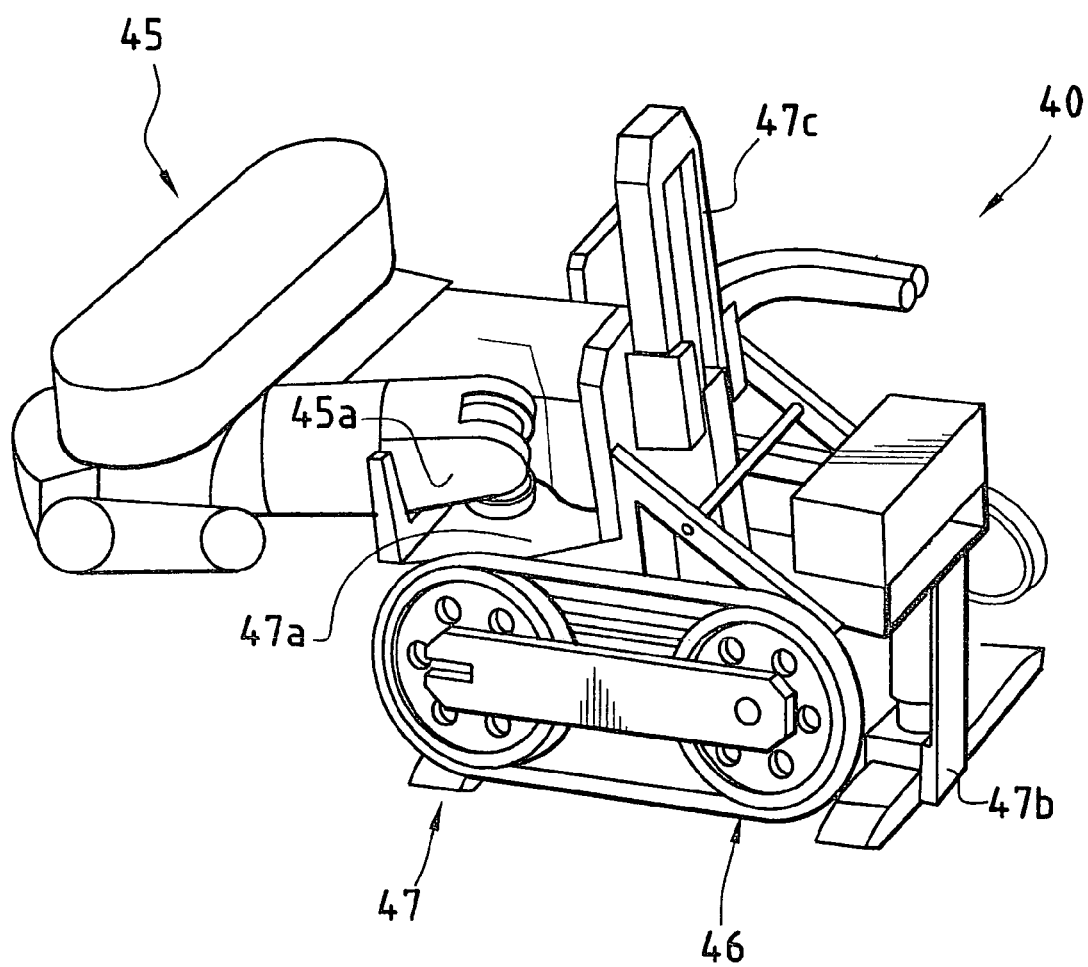
FIG. 14A is an exploded perspective view of the means for carrying out the work.

FIG. 14A shows means 40 for carrying out work which includes three main parts, a programmed and remote controlled working robot 45, a crawler 46 (shown separately in FIG. 14B) and a support 47.

Figure 14B:
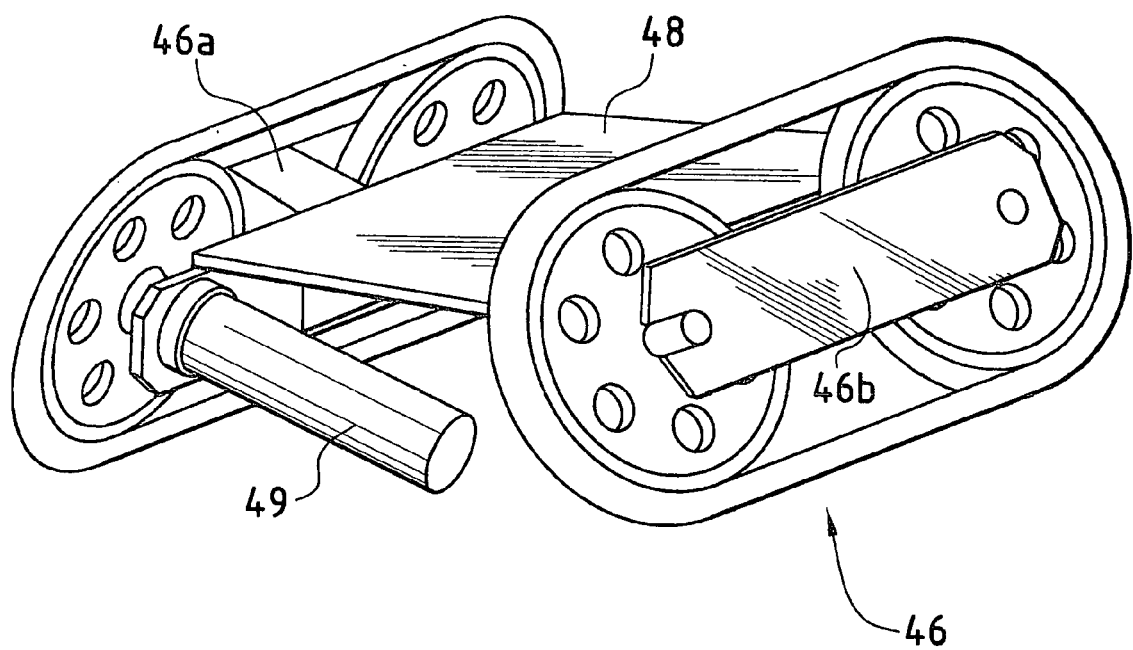
FIG. 14B is an exploded perspective view of the carriage for moving the means for working in the cold leg.

As can be seen in FIG. 14B, crawler 46 is constructed in such a way that the means for carrying out work can be moved within a pipe.

Means 46 incorporates two sets of wheels 46*a* and 46B whose spacing and inclination with respect to a median plane of crawler 46 can be adjusted so as to adjust the crawler to pipes of different inside diameter.

The crawler has a platform 48 which is designed to receive support 47 onto which robot 45 is secured.

Each of the sets of wheels 46*a* and 46*b* of crawler 46 include an independent drive motor 49 mounted on the axis of one of the wheels in the sets of wheels. Motor 49 is remote controlled to move the crawler and the means for carrying out work within the pipe in which the work is carried out.

Each of the sets of wheels may comprise two pulleys rotatably mounted on the mechanical structure of the set of wheels and a belt of toroidal shape passing over the two pulleys. Each of the wheels in the sets of wheels may also constitute an independent wheel incorporating a toroidal tire.

Support 47 comprises a structure 47*a* in the form of a plate which can be placed and secured on plate 48 of crawler 46. Two shoes 47*b* associated with jacks acting in a direction to extract or retract the shoes and a locking shoe 47*c* associated with a jack which can be activated in a direction parallel to and in a direction opposite to the direction of action of shoes 47*b* are mounted on the structure 47*a* of support 47.

When crawler 46 reaches the area where work has to be carried out, movement of the crawler being remote controlled, the crawler is stopped and the jacks of the supporting device are activated so as to place means 40 for carrying out work in a fixed position within the pipe, supporting shoes 47*b* bearing against part of the pipe, for example a lower part, and locking shoe 47*c* bearing against an opposite part of the pipe, for example an upper part.

Structure 47*a* of supporting means 47 comprises rapid connection means for robot 45 which may for example comprise dovetailed means of assembly.

The structure of the supporting means which is of one piece with plate 48 of the crawler also supports a tool magazine from which robot 45 can successively choose the working tools necessary, for example in the case of an operation which requires several successive stages using different tools.

Robot 45 is an arm of the anthropomorphic type having six axes of motor-driven rotational movement, the arm incorporating an end part 45*a* bearing a rapid attachment device for tools of the automatic type which can be operated remotely to ensure that a tool is picked up or replaced in the course of a complex operation within the pipe.

Such a robot arm of a standard type has for example been described in French patent 2,780,907 filed by the FRAMATOME company.

As indicated above, before carrying out work within the pipe, for example an operation of machining the inner part of the welds joining the replacement section of the cold leg, it is necessary to insert the means for carrying out work into the entrance to the pipe and then to control its movement within the pipe to the area where the work has to be done and finally to secure it in its working position through the shoes of the supporting device.

When work is carried out within the cold leg of the primary circuit it is possible, as indicated above, to insert means 40 through the volute 9 of the primary pump. However, in the case of nuclear reactors having a power of 900 MWe, because the pump diffuser is kept in place, the means for carrying out work cannot be lowered and located at the entry to the pipe connecting the volute to the cold leg in a single piece.

In this case, initially robot 45 is located on support or gangway 43 at the entry to the pipe and then the carriage and the support are lowered into the volute. An operator then descends within the volute and ensures that robot 45 and support 47 are coupled and that the assembly is located at the entrance to pipe 9b of the volute. Robot 45 is lowered on the plate of lift 41 borne by a carriage which permits it to move as far as gangway 43. Coupling of robot 45 to support 47 is very quick, so that the work by the operator within the volute only requires a very short time of less than one minute. The assembled means 40 for carrying out work in position at the entrance to the delivery pipe of the primary pump is remote controlled to move it within the cold leg. In order to do this means 40 is connected to a set of cables and conduits which provide a power supply to independent drive motors 49, the jacks of the support, the rotational movement motors of the components making up the robot arm and the tools fixed to the end 45a of robot arm 45. The fact that drive motors 49 for wheel sets 46a and 46b of crawler 46 are independent makes it possible to move the crawler along a route which is not necessarily straight.

When means 40 for carrying out work moved within the pipe by crawler 46 reaches the area where work has to be done, crawler 46 is caused to stop by remote control and shoes 47b and 47c of supporting device 47 are placed in a supporting position. Means 40 for carrying out work is thus positioned within the pipe in an area where work is required.

It would be possible to position means 40 within the cold leg in a single piece, by introducing the means comprising the robot arm, the support and the crawler assembled together in an open end of the cold leg within the nuclear reactor vessel. Means 40 could be lowered into the vessel by a lift similar to lift 41 and placed on an access gangway at the entrance to the pipe in the vessel which connects to the cold leg.

In any event means 40 for carrying out work is positioned in such a way that an operation to machine the inside part of the junction welds for the replacement section of the cold leg can be carried out. The junction welds are machined and inspected on the pump volute side and the vessel side one after the other.

Figure 15:
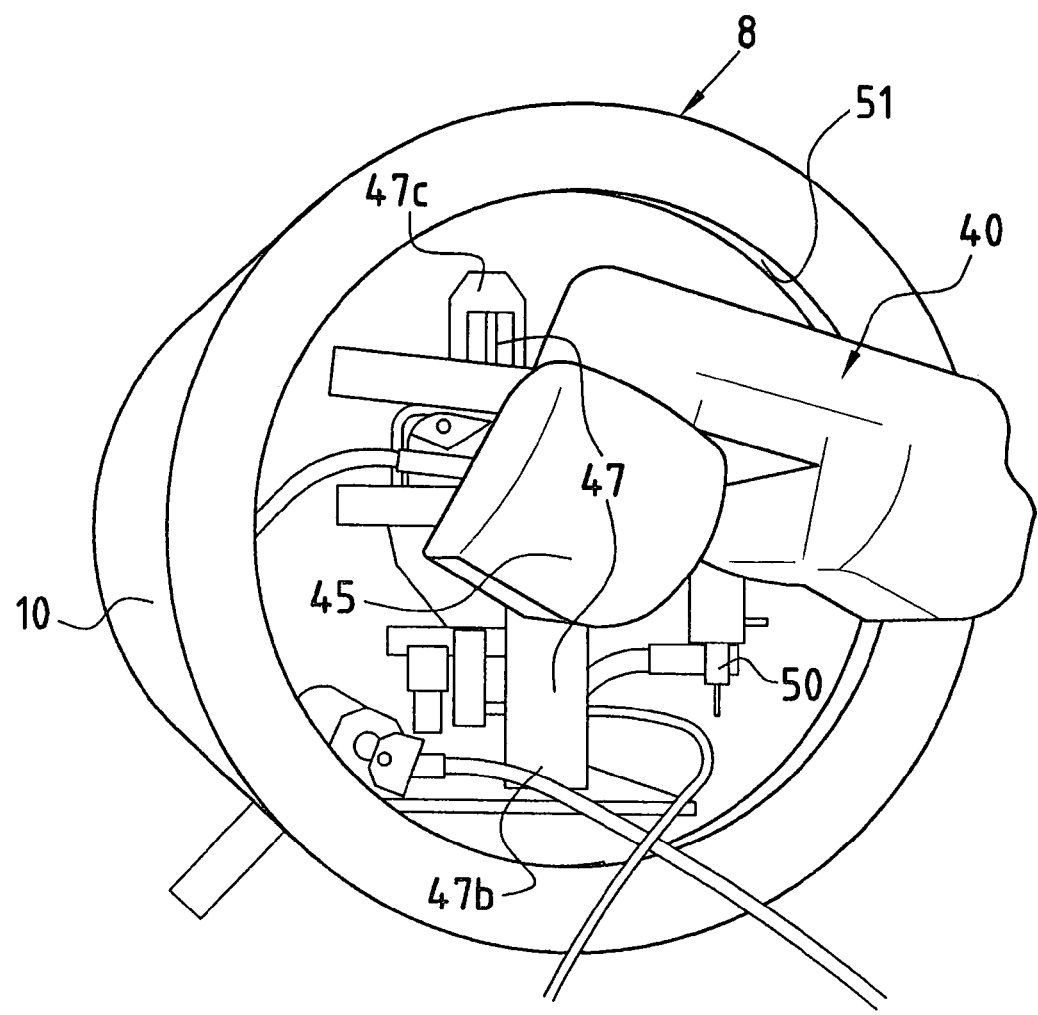
FIG. 15 is an exploded perspective view showing the means for carrying out work in the course of an operation for machining the inside surface of a connection weld in the cold leg.

FIG. 15 shows part of the joint in the primary pipe in which means 40 for carrying out work has been positioned and secured in place as described previously. So that means 40 for carrying out work can be seen within primary leg 8 only a very short section of the remaining part of the cold leg to which replacement section 10 has been fixed by welding as described previously is shown.

Supporting shoes 47b are in the low position and bear against the lower part of the inner surface of the primary leg, while a locking shoe 47c is extended to bear against the upper part of the inner surface of the cold leg. In this way means 40 for carrying out work is perfectly supported in a working position within the cold leg.

A tool 50 comprising a grinding milling cutter and motor drive is secured to the end 45a of the robot arm which makes it possible to orient the milling cutter of tool 50 and place it in a position from which the inner surface of junction weld 51 between the replacement section on one of the remaining parts of the cold leg can be ground. In order to carry out grinding the tool is located and at all times held in a machining position by the robot arm which is caused to rotate by a half-turn about an axis in line with axis 8' of cold leg 8 to grind a half-circumferential part of weld 51.

Grinding is carried out in successive passes by causing the tool to rotate about axis 8' of cold leg 8 in a single direction, the tool being returned to its initial position by the robot arm through high speed rotation at the end of each grinding pass.

The operations of positioning the means for carrying out work and machining by grinding are continuously monitored on a screen located outside the working area on which images of the working area provided by a video camera associated with tool 50 carried by the robot arm are displayed.

Initially the inner part of the partial welds on the replacement length of the primary pipe is therefore ground, these welds having been previously made by filling an inner part of the bevel made between the replacement section and the end of a remaining part of the primary pipe.

Grinding of the inside part of the weld connecting the replacement section of the primary pipe is carried out in a programmed way, the various successive stages in grinding being performed automatically one after the other.

After the operation of grinding the internal surface of a weld, the shape of the ground surface is inspected using a measuring tool which is taken up by the robot arm on the support after the grinding operation has been completed. This operation can also be performed in a programmed and automatic way.

The weld area of the inner surface of the cold leg is then cleaned after grinding followed by inspection of the ground and cleaned inner surface of the weld using penetrating dye. In order to do this robot arm 45 is controlled so that its end part 45a is equipped with the tools used in succession to carry out the successive operations necessary to perform the inspection using penetrating dye. These successive operations comprise applying a penetrating dye to the area under inspection, removing the surplus dye by wiping, drying the area inspected, remote visual inspection of the inspected area to check that any surplus dye has been removed, applying a developer to the inspected area and remote visual inspection of the inspected area to determine whether any defects are present, the remote visual inspections being carried out by cameras associated with the tools used for the penetrating dye check and picked up in succession by end 45a of robot arm 45.

The images displayed by the camera are displayed on a television screen in an inspection area at a distance from the area where the work is performed.

Radiographic inspection of the partial welds of the replacement section in the cold leg is also performed before completing filling of the weld bevels of the two welded joints for the replacement section.

Internal cleaning of the welds is then performed using the remote-controlled and preprogrammed means 40 for carrying out work within the primary pipe. The whole of the inside of the cold leg is also cleaned. Then the interior of the weld zones is inspected using the remote controlled and preprogrammed means for working within the primary pipe in the same way as when inspecting these weld zones after partial welding.

After the welding means and their supports on the outside of the primary pipe have been dismantled, external grinding of the welds and then inspection of the welded zones using penetrating dye is performed on the outside of the primary pipe, it being possible for this inspection to be performed manually. Finally a radiographic inspection of the completed welds is performed.

The operations carried out within the primary pipe for correcting the inner parts of the welds by grinding and the inspections and finishing operations on the inner part of the partial welds make is possible to ensure that the inner parts of these welds are of perfect quality and that there is a complete absence of defects on the surface which comes into contact with the primary water in the course of the operation of the nuclear reactor.

Furthermore, inspection of the inner parts of the welds carried out by the tool makes it possible to check that no defect has been introduced as a result of the final welding operation.

After the welds of the replacement section have been made and inspected, the tools used, such as the tools to support the cold leg and the positioning cradle and the struts supporting the replacement section, are removed.

The lengths of the nuclear reactor auxiliary and back-up lines which had to be cut in order to fit and fix the replacement section of the cold leg are then replaced or repositioned.

After all the auxiliary lines have been restored, various operations to dismantle and remove the components required for the work which have remained in position, such as the biological shield placed in the primary pipe on the vessel side and the transfer frame mounted on top of the pump volute, are carried out. The components inserted into the pump volute, such as the protective basket and the vinyl film protecting the diffuser, are also dismantled and removed. A remote visual examination of the interior of the primary pump volute is performed to check that the system is clean and then the pipe protecting the diffuser of the primary pump and the interface ring are dismantled before refitting the water guide within the volute. The joint plane of the volute is checked to ensure it is horizontal and the joint plane is cleaned before refitting the pump impeller and the pump drive motor.

The final reassembly operations on the auxiliary and back-up circuit lines are performed before ensuring that the primary pump is reassembled. The primary circuit can then be placed back in service.

The procedure according to the invention therefore makes it possible to replace a section of a cold leg in a nuclear reactor ensuring that the connecting welds for the replacement section are perfectly made.

These results are achieved in particular using means for carrying out work which is inserted into the primary pipe to carry out machining and inspection operations. This means which can be inserted into the primary pipe via a component such as the primary pump or the reactor vessel can be controlled wholly automatically by remote control, in particular for positioning the means in the working position within the primary pipe. The operations performed in the working area are generally carried out in a programmed and automatic way following a predetermined or remotely operated sequence. In the case of remote operation using a robot such as the robot arm described above, the latter accurately locates its connecting support to the structure of the supporting means in space in an initial stage using a position sensor fixed to the end part 45a of the arm.

The invention is not restricted to the embodiment which has been described.

Thus the means for carrying out work can be used to carry out operations other than grinding and inspection of the inner part of the welds of the replacement section for the primary pipe.

The means for carrying out work may be constructed in a manner other than that described and may incorporate any means for carrying out work, remote control or programming to carry out any machining or inspection work on the inner parts of the welds of the replacement section.

The means for carrying out work may also perform other operations such as the filling of defective zones within the primary pipe after machining.

In this case, instead of replacing a defective section of the primary pipe, a defective section of the primary pipe which incorporates defective areas on its internal surface can be repaired. After the defective areas have been identified through an inspection operation, the defective areas are machined and filled by welding, followed by final inspection. In order to perform these operations within the primary pipe the means for carrying out work described above is used, and this is used in the same way as in the case of machining, inspecting and finishing the welds for a replacement section.

In general, the procedure and the means according to the invention may be used not only to effect the replacement of a section of a cold leg but may also be used to effect the replacement of a section of any leg in the primary circuit of the nuclear reactor.

In the case of a leg which incorporates curved parts, like the cross-over leg, it is possible to use the means for carrying out work described, inasmuch as the crawler which incorporates two sets of independent motor-driven wheels can be moved within the curved parts of the pipe.

The invention applies to any nuclear reactor incorporating pipes of large dimensions used for the circulation of a liquid cooling the reactor core.

The invention claimed is:

1. A procedure for the repair of a defective section of a pipe in the primary circuit of a nuclear reactor cooled by pressurized water connecting a first and a second component of the primary circuit, the procedure comprising the steps:

assembling a self contained unitary movable robotic work device having three main parts, a programmed and remote controlled working anthropomorphic arm movable along six axes, a crawler providing motion for the device, and a support for stabilizing the device in a pipe;

introducing in its entirety the robotic work device, inclusive of its three main parts, into the pipe from one of the first and second components of the primary circuit;

remotely controlling the positioning of the work device within the pipe;

an end part of the arm being remotely operated under computer control to selectively pick up and replace on-board automatic tools to perform tasks respectively including— a) inspecting a pipe interior surface b) machining selected inspected interior portions of the pipe surface; and c) welding selected machined portions of the pipe interior surface.

* * * * *